US009294753B2

(12) United States Patent
Lee et al.

(10) Patent No.: US 9,294,753 B2
(45) Date of Patent: Mar. 22, 2016

(54) APPARATUS FOR EXTRACTING IMAGE OBJECT IN 3D IMAGE SYSTEM AND METHOD THEREOF

(71) Applicant: ELECTRONICS AND TELECOMMUNICATIONS RESEARCH INSTITUTE, Daejeon (KR)

(72) Inventors: Su Woong Lee, Daejeon (KR); Seok Bin Kang, Daejeon (KR); Suk Hyun Lim, Seoul (KR); Jun Suk Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 593 days.

(21) Appl. No.: 13/687,800

(22) Filed: Nov. 28, 2012

(65) Prior Publication Data
US 2013/0286162 A1  Oct. 31, 2013

(30) Foreign Application Priority Data

Apr. 25, 2012  (KR) ........................ 10-2012-0043281

(51) Int. Cl.
*G06T 15/00* (2011.01)
*H04N 13/00* (2006.01)
*G06T 7/00* (2006.01)
(52) U.S. Cl.
CPC .......... *H04N 13/0055* (2013.01); *G06T 7/0081* (2013.01); *G06T 2207/10028* (2013.01)
(58) Field of Classification Search
CPC ................... G06T 7/0081; G06T 2207/20144
See application file for complete search history.

(56) References Cited

U.S. PATENT DOCUMENTS

| 6,678,407 | B1* | 1/2004 | Tajima | 382/167 |
| 6,912,293 | B1* | 6/2005 | Korobkin | 382/100 |
| 8,331,695 | B1* | 12/2012 | Delva | 382/218 |
| 2005/0117804 | A1* | 6/2005 | Ida et al. | 382/199 |
| 2006/0045357 | A1* | 3/2006 | Schwartz | G06T 7/0081 382/232 |
| 2007/0297674 | A1* | 12/2007 | Declerck et al. | 382/173 |
| 2009/0244309 | A1* | 10/2009 | Maison et al. | 348/222.1 |
| 2011/0216213 | A1* | 9/2011 | Kawahata | 348/222.1 |
| 2011/0293137 | A1* | 12/2011 | Gurman et al. | 382/103 |
| 2013/0016097 | A1* | 1/2013 | Coene et al. | 345/419 |

FOREIGN PATENT DOCUMENTS

KR    10-1064946 B1    9/2011

OTHER PUBLICATIONS

Lu Xia et al., "Human Detection Using Depth Information by Kinect", Computer Vision and Pattern Recognition Workshops (CVPRW), 2011 IEEE Computer Society Conference, Jun. 20-25, 2011, pp. 55-22.
Dae Sung Moon et al., "Real-Time Person Detection System for CCTV Environment", The 24th Workshop Regarding Treatment and Understanding of Image, Feb. 15-17, 2012.

* cited by examiner

Primary Examiner — Charles Tseng
(74) Attorney, Agent, or Firm — Rabin & Berdo, P.C.

(57) ABSTRACT

Disclosed are an apparatus for extracting an image object in a 3D image system and a method thereof.
The apparatus for extracting an image object in a 3D image system includes: an image inputting unit receiving an image; a space setting unit setting virtual space at which the image object is positioned from the received image; and an object extracting unit extracting the image object from the set virtual space from the received image.

11 Claims, 13 Drawing Sheets

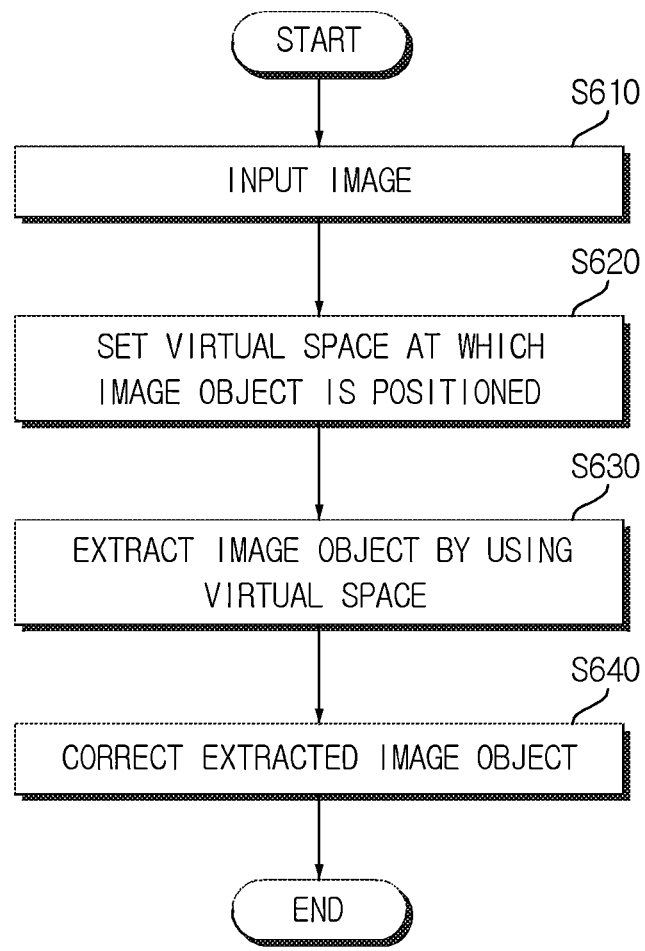

APPARATUS FOR EXTRACTING IMAGE OBJECT IN 3D IMAGE SYSTEM AND METHOD THEREOF

CROSS-REFERENCE TO RELATED APPLICATIONS

This application claims priority to and the benefit of Korean Patent Application No. 10-2012-0043281 filed in the Korean Intellectual Property Office on Apr. 25, 2012, the entire contents of which are incorporated herein by reference.

TECHNICAL FIELD

The present invention relates to a method for extracting an image object, and more particularly, to an apparatus for extracting an image object in a 3D image system and a method thereof that are configured to extract an image object positioned in virtual space from an image input by using depth information and correct the extracted image object by using visible light information.

BACKGROUND ART

A 3D image system for displaying a 3D image, for example, an experience learning system projects a user's image in spaces including a subway station, a museum, and the like which are implemented virtually by using 3D and thereafter, enables a user's image object projected on a 3D content screen according to a user's actual action to visit the museum or learn English with a native speaker in line with a 3D content screen while performing a predetermined appointed action.

In this system, accuracy and stability of extracting a person image exert a great influence on total system performance. In the existing background subtraction based technologies, an object can be effectively extracted with a somewhat small calculation amount, but the system needs to be initialized whenever the system is driven and using a blue screen, and the like are disabled due to a feature of the system in which an experiencer's image needs to be extracted.

In the experience learning system, a learner that performs an experience and learners who perform learning while viewing the learner are present due to the feature thereof. In the existing object extracting system, it is possible to extract all users reflected on a viewing angle of a camera, but it is difficult to selectively extract a specific user.

SUMMARY OF THE INVENTION

The present invention has been made in an effort to provide an apparatus for extracting an image object in a 3D image system and a method thereof that are configured to extract an image object positioned in virtual space from an image input by using depth information and correct the extracted image object by using visible light information.

An exemplary embodiment of the present invention provides an apparatus for extracting an image object in a 3D image system including: an image inputting unit receiving an image; a space setting unit setting virtual space at which the image object is positioned from the received image; and an object extracting unit extracting the image object from the set virtual space from the received image.

The object extracting unit may judge whether each pixel is included in the set virtual space by using depth information measured for each pixel in the image and extract the image object positioned in the set virtual space according to the judgment result.

The object extracting unit may judge whether each pixel is included in the set virtual space by using the depth information measured for each pixel in the image in a projection coordinate system.

The virtual space may be polyhedral space previously designated by a user.

The space setting unit may receive a plurality of points from the user and set virtual space including one floor plane constituted by the plurality of received points.

The space setting unit may receive the plurality of points from the user, and when the number of points of which the depths are measured validly among points adjacent to the corresponding point for each of the plurality of received points is equal to or more than a predetermined number, set one floor plane including the corresponding point and set the virtual space including the one set floor plane.

The apparatus may further include an object correcting unit correcting an image including the extracted image object by using visible light information.

The object correcting unit may allocate a type for each pixel for each block having a predetermined size in the image including the image object, and calculate a probability that a pixel allocated as a type in which a foreground or a background is obscurely discriminated belongs to the foreground by using a difference in distance and a difference in color from an adjacent pixel, and correct the image object according to the calculated probability.

The object correcting unit may allocate −1 to pixels judged as the background positioned in the virtual space, allocate 0 to pixels in which the foreground or the background is obscurely discriminated, and allocate 1 to pixels judged as the foreground.

The object correcting unit may allocate a type for each pixel for each block having a predetermined size in the image including the image object, calculate a probability that some pixels among the pixels allocated as the type in which the foreground or the background is obscurely discriminated belong to the foreground by using the difference in distance and the difference in color from the adjacent pixels, and average predetermined calculated probabilities of pixels adjacent to some other remaining pixels to estimate the probability with the average value.

The object correcting unit may allocate a type for each pixel for each block having a predetermined size in the image including the image object, calculate a probability that a pixel allocated as a type in which a foreground or a background is obscurely discriminated belongs to the foreground by using a difference in distance and a difference in color from an adjacent pixel, and correct the image object according to the calculated probability, and mix a pixel value of a previous image and a pixel value of a current image that are positioned at the same position for each pixel of the image including the corrected image object at a predetermined ratio to correct the image object according to the mixing ratio.

The apparatus may further include a space setting unit setting the virtual space at which the image object is positioned from the received image.

Another exemplary embodiment of the present invention provides a method for extracting an image object in a 3D image system including: receiving an image; setting a virtual space at which the image object is positioned from the received image; and extracting the image object from the set virtual space from the received image.

the extracting the image object may include judging whether each pixel is included in the pre-set virtual space by using depth information measured for each pixel in the image; and extracting the image object positioned in the pre-set virtual space according to the judgment result.

The virtual space may be polyhedral space previously designated by a user.

the setting virtual space may include receiving a plurality of points from the user; and setting the virtual space including one floor plane constituted by the plurality of received points.

The setting virtual space may include receiving a plurality of points from the user; setting one floor plane including the corresponding point when the number of points of which the depths are measured validly among points adjacent to the corresponding point for each of the plurality of received points is equal to or more than a predetermined number; and setting the virtual space including the one set floor plane.

The method may further include correcting an image including the extracted image object for each block having a predetermined size.

the correcting an image may include allocating a type for each pixel for each block having a predetermined size in the image including the image object; calculating a probability that a pixel allocated as a type in which a foreground or a background is obscurely discriminated belongs to the foreground using a difference in distance and a difference in color from an adjacent pixel; and correcting the image object according to the calculated probability.

The correcting an image may include allocating a type for each pixel for each block having a predetermined size in the image including the image object; calculating a probability that some pixels among the pixels allocated as the type in which the foreground or the background is obscurely discriminated belong to the foreground using the difference in distance and the difference in color from the adjacent pixels; and averaging predetermined calculated probabilities of pixels adjacent to some other remaining pixels and estimating the probability with the average value.

The correcting an image may include allocating a type for each pixel for each block having a predetermined size in the image including the image object; calculating a probability that a pixel allocated as a type in which a foreground or a background is obscurely discriminated belongs to the foreground using a difference in distance and a difference in color from an adjacent pixel and correcting the image object according to the calculated probability; and mixing a pixel value of a previous image and a pixel value of a current image that are positioned at the same position for each pixel of the image including the corrected image object at a predetermined ratio and correcting the image object according to the mixing ratio.

According to the exemplary embodiments of the present invention, an image object positioned in virtual space is extracted from an image input by using depth information and the extracted image object is corrected by using visible light information to extract the image object more accurately than the existing extraction method.

A uvD coordinate system is used and a look-up table is used at the time of extracting the image object positioned in the virtual space by using the depth information from the input image to decrease a calculation amount required for extracting the object.

The uvD coordinate system is used and the look-up table is used at the time of extracting the image object positioned in the virtual space by using the depth information from the input image to decrease a calculation amount required for extracting the object, which can be processed in real time.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 6 is a diagram illustrating a method for extracting an image object according to an exemplary embodiment of the present invention.

Figure 1:
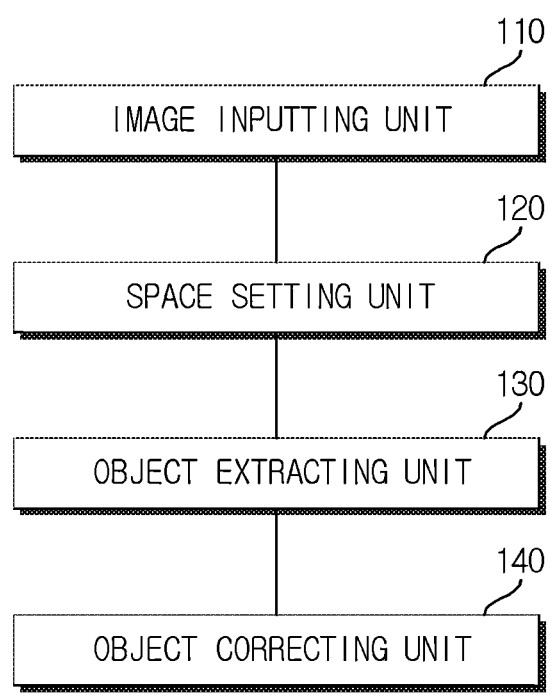
FIG. 1 is a diagram illustrating an apparatus for extracting an image object according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an apparatus and a method for extracting an image object in a 3D image system according to exemplary embodiments of the present invention will be described in detail with reference to the accompanying drawings, FIGS. 1 to 6. First of all, parts necessary to understand an operation and functions according to the present invention will be described in detail. In describing the present invention, well-known functions or constructions will not be described in detail since they may unnecessarily obscure the understanding of the present invention. We should note that in giving reference numerals to elements of each drawing, like reference numerals refer to like elements even though like elements are shown in different drawings.

In particular, the present invention proposes a scheme that can accurately extract an image object by extracting an image object positioned in predetermined space from an input image by using depth information and correcting the extracted image object by using visible light information.

FIG. 1 is a diagram illustrating an apparatus for extracting an image object according to an exemplary embodiment of the present invention.

As illustrated in FIG. 1, the apparatus for extracting the image object according to the exemplary embodiment of the present invention may include an image inputting unit 110, a space setting unit 120, an object extracting unit 130, and an object correcting unit 140.

The image inputting unit 110 may receive an image acquired by a depth camera, for example, a live video, an image file, and like. Herein, the image file may include depth information and visible light information as a pair.

The space setting unit 120 may set virtual space at which an image object is positioned, from the received image. Herein, the virtual space may mean polyhedral space previously designated by a user.

FIGS. 2A to 2E are diagrams for describing a principle of setting space according to an exemplary embodiment of the present invention.

Figure 2A:
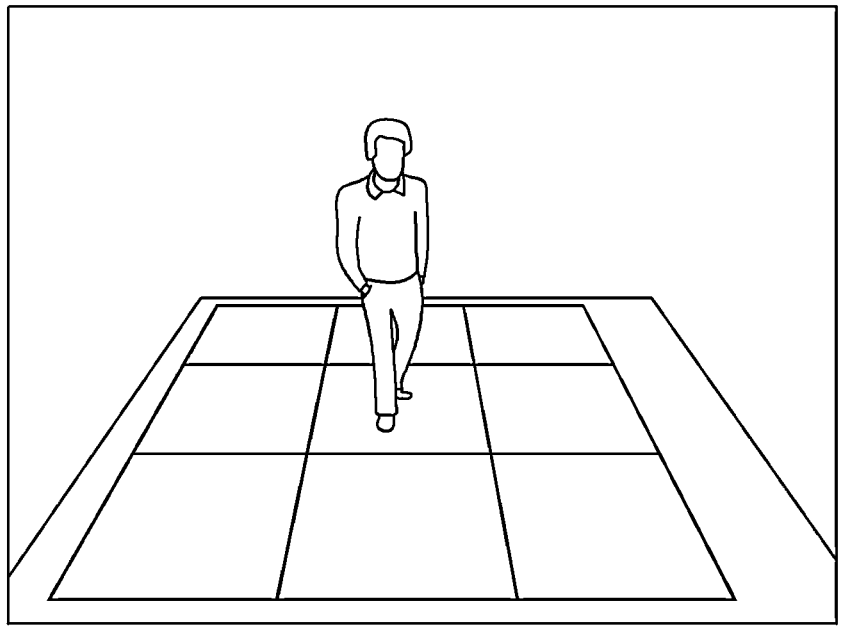
FIGS. 2A to 2E are diagrams for describing a principle of setting space according to an exemplary embodiment of the present invention.

In FIG. 2A, the space setting unit 120 may extract one boundary plane configuring the virtual space at which the image object is positioned in the input image, for example, four apexes (black points) on the bottom surface thereof. Herein, the virtual space used as one example may be constituted by six planes as a hexahedron and six boundary planes may include one top surface, four lateral surfaces, and one bottom surface.

In this case, each of four apexes has a coordinate value (u,v,D) in a projection coordinate system.

In this case, the video camera may not measure the depth of a specific material. The space setting unit 120 verifies depth information of a pixel selected as the apex and neighboring pixels, and when the number of pixels in which the depth is measured validly is less than a predetermined threshold as the verification result, receives the apex again.

On the contrary, the space setting unit 120 extracts a pixel having depth information of a median value in the depth information of the neighboring pixels to use the extracted pixel as the apex when the number of the pixels in which the depth is measured validly is equal to or more than the predetermined threshold as the verification result.

Figure 2B:
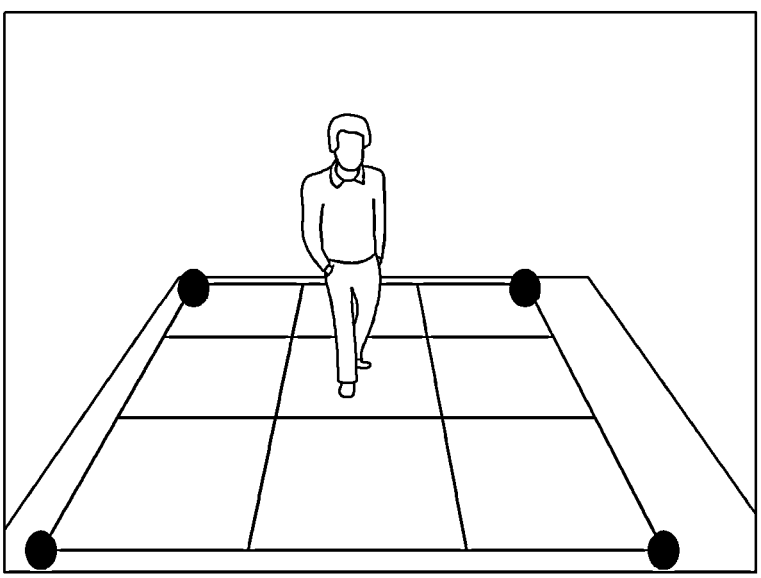

In FIG. 2B, the space setting unit 120 may convert coordinate values of four extracted apexes from the projection coordinate system into an XYZ coordinate system, and acquire a floor plane and a normal vector to minimize a squared error by using four converted apexes.

Figure 2C:
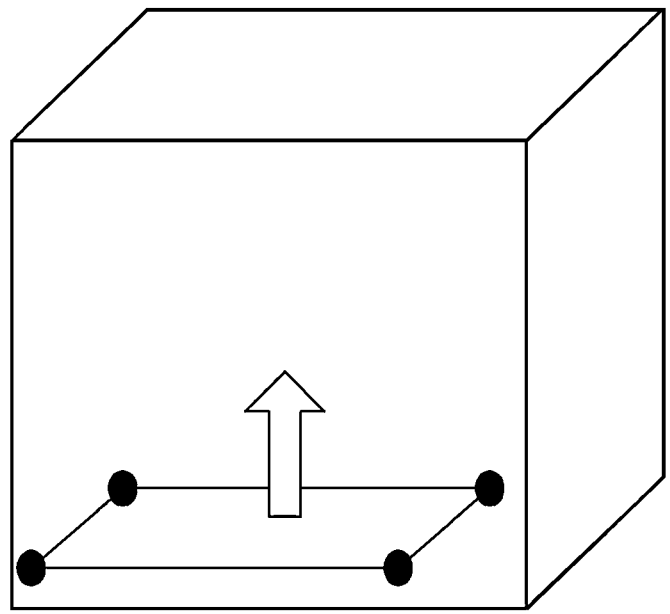
Figure 2D:
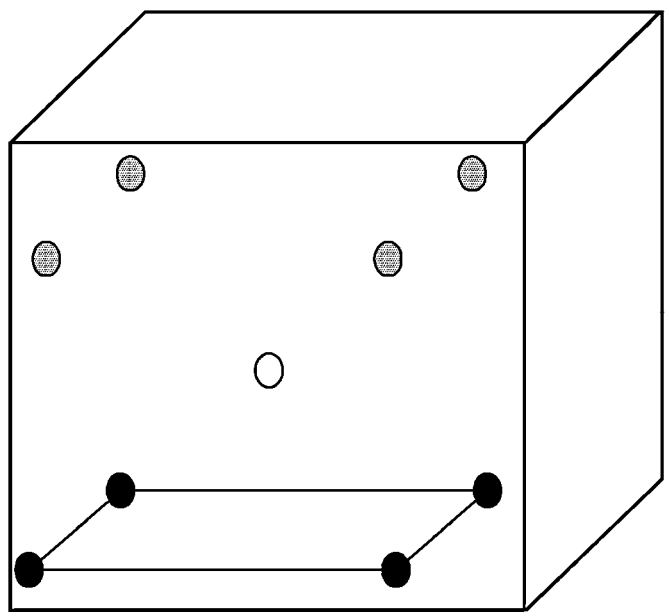

In FIGS. 2C and 2D, the space setting unit 120 may extract four apexes (gray points) on the top surface by using the floor plane and the normal vector. The space setting unit 120 may extract a center point (white point) of virtual space based on four apexes of each of the top surface and the bottom surface.

Figure 2E:
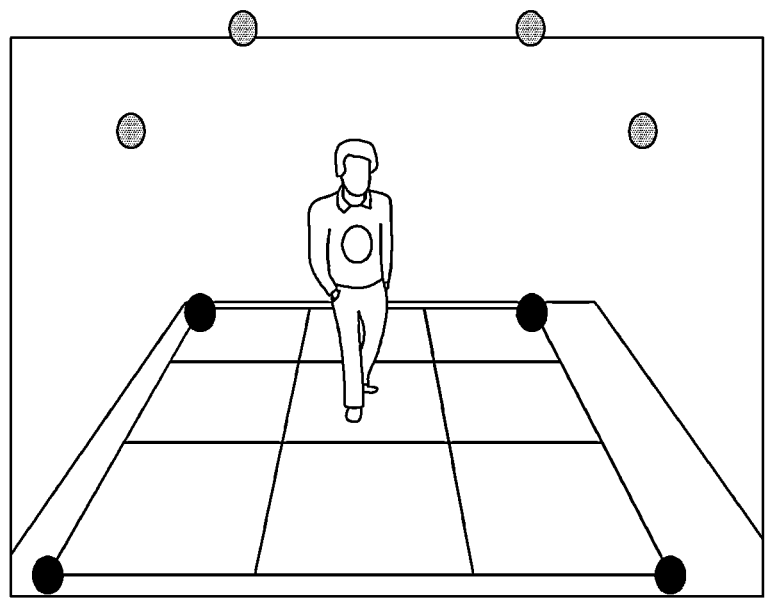

In FIGS. 2D and 2E, the space setting unit 120 may convert nine points of the extracted XYZ coordinate system, that is, four apexes on the top surface, four apexes on the bottom surface, and one center point into the projection coordinate system.

The object extracting unit 130 may extract the image object by using the set virtual space.

Figure 3:
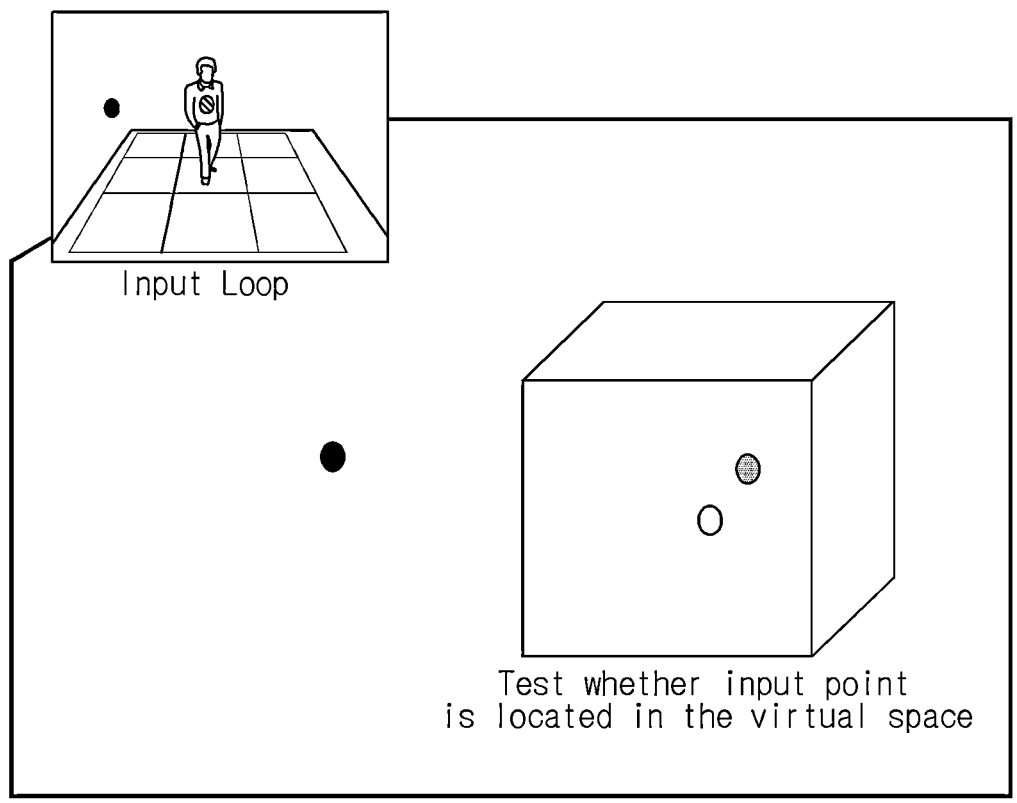
FIG. 3 is a diagram for describing a principle of extracting an object according to an exemplary embodiment of the present invention.

FIG. 3 is a diagram for describing a principle of extracting an object according to an exemplary embodiment of the present invention.

As illustrated in FIG. 3, the object extracting unit 130 may judge a foreground or a background for each pixel of the image by using predetermined virtual space.

For example, when any one pixel of the image does not enter the predetermined virtual space, the corresponding pixel is marked as the background (black point) and when any one pixel enters the virtual space, the corresponding pixel may be marked as the foreground (gray point).

The object extracting unit 130 converts the projection coordinate system of the input image into the XYZ coordinate system and thereafter, judges whether each pixel is included in the virtual space in the converted XYZ coordinate system. However, since the process of converting the XYZ coordinate system of the input image is required, total performance of a system in which real-time processing is required deteriorates.

Therefore, a calculation amount in judgment needs to be minimized in order to improve the total performance, and in the present invention, the object extracting unit 130 intends to judge whether each pixel is included in the virtual space in the projection coordinate system.

For example, the relationship between (X,Y,Z) and (u,v,D) may be expressed by [Equation 1] below in a pin-hole camera model.

$$D=Z, u=(f/Z)*X, v=(f/Z)*Y \quad \text{[Equation 1]}$$

A predetermined floor plane may be expressed by [Equation 2] below in the (X,Y,Z) coordinate system.

$$aX+bY+cZ+d=0 \quad \text{[Equation 2]}$$

When [Equation 1] above is substituted into [Equation 2] above, [Equation 3] below may be acquired.

$$(a/f)*u+(b/f)*v+1+d/D=0 \quad \text{[Equation 3]}$$

Therefore, a floor plane in (X,Y,Z) space may form a plane even in $(u,v,D^{-1})$ space at all times, and in the present invention, (u,v,D) intends to be converted into $(u,v,D^{-1})$.

The object extracting unit 130 may judge whether the value (u,v,D) of each pixel of the input image is included in the predetermined virtual space by using [Equation 4] below.

$$(a_i u + b_i v + c_i D^{-1} + d_i) \times (a_i u_s + b_i v_s + c_i D_s^{-1} + d_i) > 0 \quad \text{[Equation 4]}$$

Herein, i may have a value of 1, 2, 3, 4, 5, and 6 and indicates each of the boundary plans constituting the virtual space, and $(u_s, v_s, D_s)$ may indicate a coordinate value of one point included in the predetermined virtual space, for example, the center point of the virtual space.

In this case, in [Equation 4] above, it can be seen that a second item, $(a_i v_s + b_i v_s + c_i D_s^{-1} + d_i)$ is continuously constant and a first item, $(a_i u + b_i v + d_i)$ of $(a_i u + b_i v + c_i D^{-1} + d_i)$ is continuously constant. Therefore, when only $c_i D^{-1}$ of the second item is calculated, the judgment result may be easily deduced.

In the present invention, $(a_i u + b_i v + d_i)$ of the first item, $(a_i u + b_i + c_i D^{-1} + d_i)$ and the second item, $(a_i u_s + b_i v_s + c_i D_s^{-1} + d_i)$ is, in advance, calculated and the calculated values are, in advance, stored in a lookup table, only $c_i D^{-1}$ of each pixel of the input image is calculated to judge whether each pixel is included in the predetermined virtual space by using the calculated $c_i D^{-1}$ and the lookup table in order to reduce the calculation amount while performing the judgment.

The object correcting unit 140 may correct the extracted image object by using visible light information, for example, a color, and the like. That is, the object correcting unit 140 divides into the foreground and the background a pixel which is not divided into the foreground and the background because the object extracting unit 130 is incapable of measuring the depth information.

FIGS. 4A to 4E are diagrams for describing a principle of correcting an object according to an exemplary embodiment of the present invention.

Figure 4A:
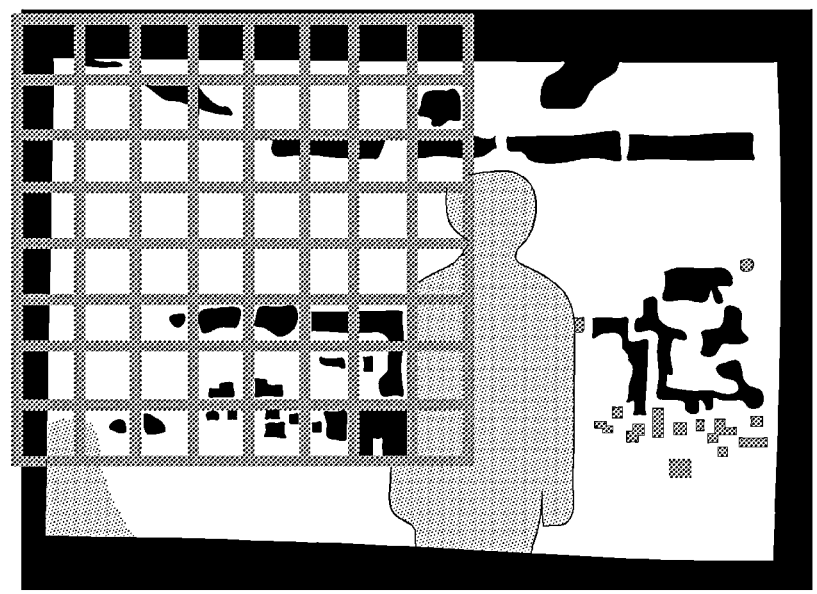
FIGS. 4A to 4E are diagrams for describing a principle of correcting an object according to an exemplary embodiment of the present invention.
Figure 4B:
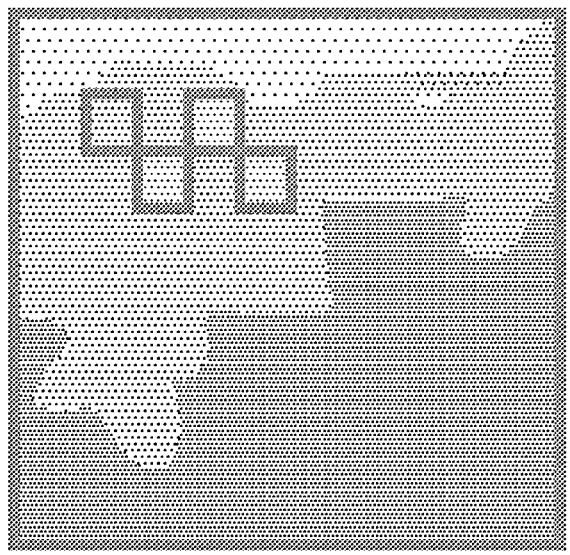
Figure 4C:
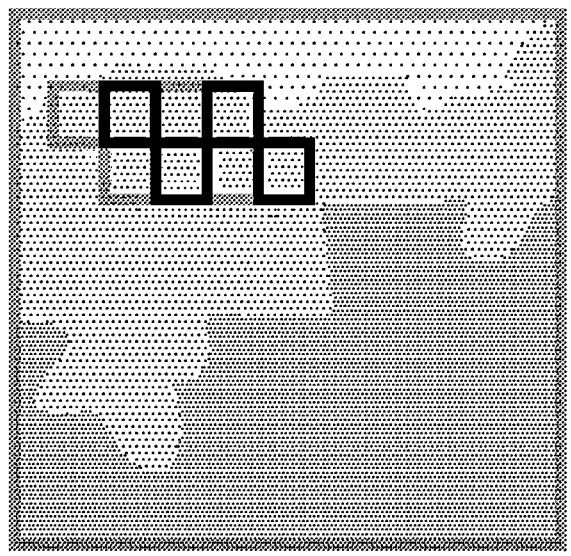

In FIG. 4A, the object correcting unit 140 may set a block having a predetermined size in the image, and herein, the size of the block may be changed if necessary.

The object correcting unit 140 processes the image for each block, and in this case, the object correcting unit 140 may allocate a type for calculating confidence for each pixel of the block. That is, the object correcting unit 140 1) allocates −1 to all the pixels when all pixels in the block is the background and 2) allocates 1 to all the pixels when all the pixels in the block are the foreground. The object correcting unit 140 3) allocates 1 to the pixel as the foreground, 2) allocates 0 to a pixel as the background, of which the depth is measured, and 3) allocates 0 to a pixel as the background, of which the depth is not measured when the foreground and the background are mixed in the block.

That is, all the pixels may be expressed as −1, 0, and 1, −1 indicates a pixel in which the background is apparent, 0 indicates a pixel in which the foreground or the background is uncertain, and 1 indicates a pixel in which the foreground is apparent.

The object correcting unit 140 may calculate a probability that the pixel in which the type is allocated as 0 will belong to the foreground. In this case, in the present invention, it may be assumed that pixels acquired in the same image object have a similar color and are positioned close to each other in a (u,v) coordinate system.

The object correcting unit 140 may calculate the probability by using [Equation 5] below.

$$FB_i = \frac{\sum_j \frac{FB_j}{\text{Color\_distance}(i, j) + \text{Spatial\_distance}(i, j)}}{\sum_j \frac{1}{\text{Color\_distance}(i, j) + \text{Spatial\_distance}(i, j)}}$$ [Equation 5]

Herein, i denotes a current pixel to be calculated, j denotes a pixel adjacent to i, and $FB_j$ denotes a type of a j-th pixel.

In this case, the object correcting unit 140 does not calculate the probability with respect to all pixels in which the type is allocated as 0 but calculates the probability only with respect to some pixels for real-time processing. For example, in FIGS. 4B and 4C, the object correcting unit 140 calculates the probability by using [Equation 3] only with respect to some pixels (a blue rectangle) and estimates the probability with respect to other remaining pixels (a green rectangle) with an average value by averaging calculation results of neighboring pixels.

Figure 4D:

In FIG. 4D, the object correcting unit 140 may correct the image object according to the calculated probability. That is, the object correcting unit 140 judges the corresponding pixel as the foreground when the probability is equal to or more than the predetermined threshold.

Figure 4E:

In FIG. 4E, the object correcting unit 140 may perform time-domain filtering of the corrected image object according to the probability. That is, the object correcting unit 140 corrects an image object of a current image by considering results of a previous image and the current image when successive images are received.

For example, by setting the result of the previous image and the result of the current image as 2:8, an average value thereof is applied. In this case, in order to prevent a phenomenon which occurs at an afterimage, [0.2, 0.8] is rescaled to [0, 1].

In this case, a ratio between the result of the previous image and the result of the current image may be controlled.

Figure 5A:
FIGS. 5A to 5C are diagrams illustrating an extraction result of an image object according to an exemplary embodiment of the present invention.
Figure 5B:
Figure 5C:

FIGS. 5A to 5C are diagrams illustrating an extraction result of an image object according to an exemplary embodiment of the present invention.

FIG. 5A illustrates the object image extracted from the object extracting unit, and FIGS. 5B and 5C illustrate the object image corrected by the object correcting unit. In particular, FIG. 5B illustrates the image object corrected according to the probability to belong to the foreground and FIG. 5C illustrates a result of performing the time-domain filtering of the corrected image object.

In FIGS. 5B and 5C, the image object is extracted more accurately as compared with in FIG. 5.

FIG. 6 is a diagram illustrating a method for extracting an image object according to an exemplary embodiment of the present invention.

As illustrated in FIG. 6, an apparatus for extracting an image object (hereinafter, referred to as an image object extracting apparatus) according to the present invention may receive an image, for example, a live video, an image file, and the like (S610).

Next, the image object extracting apparatus may set virtual space at which the image object is positioned from the received image (S620).

Next, the image object extracting apparatus may extract the image object by using the set virtual space (S630). That is, the image object extracting apparatus judges whether each pixel of the input image is included in the predetermined virtual space and extracts the image object according to the judgment result.

Next, the image object extracting apparatus may correct the extracted image object by using visible light information (S640). In detail, the image object extracting apparatus processes the image for each block, and in this case, the image object extracting apparatus allocates a type for calculating confidence for each pixel of the block, and may allocate all pixels to a background, that is, allocate −1 to pixels in which a background is apparent, allocate 0 to pixels in which a foreground or the background is obscurely discriminated because the depth is not measured due to noise of a sensor, and allocate 1 to pixels in which the foreground is apparent.

The image object extracting apparatus may calculate a probability in which pixels of which types are allocated as 0 will belong to the foreground and correct the image object according to the calculated probability. That is, an object correcting unit 140 judges the corresponding pixel as the foreground to correct the image object when the probability is equal to or more than a predetermined threshold.

The image object extracting apparatus may perform time-domain filtering of the image object corrected according to the probability. That is, the image object extracting apparatus corrects the image object by mixing results of a previous image and a current image at a predetermined ratio when receiving successive images.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for extracting an image object, comprising a non-transitory computer-readable medium tangibly embodying computer-readable instructions, the instructions when executed by a computer implementing:
    an image inputting unit receiving an image;
    a space setting unit setting virtual space at which the image object is positioned from the received image;
    an object extracting unit extracting the image object from the set virtual space from the received image; and
    an object correcting unit correcting an image including the extracted image object at least in part by calculating a probability associated with a type allocated to a pixel in the image, the type indicating a level of confidence relating to whether the pixel belongs to a foreground or a background of the image,
    wherein:
    the object correcting unit
        uses visible light information,
        allocates the type for each pixel for each block having a predetermined size in the image including the image object, and
        calculates a probability that a pixel allocated as a type in which a foreground or a background is obscurely discriminated belongs to the foreground by using a difference in distance and a difference in color from an adjacent pixel, and corrects the image object according to the calculated probability, and
    the space setting unit extracts XYZ coordinates of apexes and a center point of polyhedral space as the set virtual space and converts the extracted XYZ coordinates into projection coordinates, and the object extracting unit calculates positions of the center point and each pixel in the image using boundary plans constituting the set virtual space on a predetermined projection coordinate system according to the projection coordinates and determines whether each pixel belongs to a foreground.

2. The apparatus of claim 1, wherein:
    the space setting unit receives a plurality of points and sets virtual space including one floor plane constituted by the plurality of received points.

3. The apparatus of claim 2, wherein:
    the space setting unit receives the plurality of points, and when the number of points of which the depths are measured validly among points adjacent to the corresponding point for each of the plurality of received points is equal to or more than a predetermined number, sets one floor plane including the corresponding point and sets the virtual space including the one set floor plane.

4. The apparatus of claim 1, wherein:
    the object correcting unit allocates −1 to pixels judged as the background positioned in the virtual space, allocates 0 to pixels in which the foreground or the background is obscurely discriminated, and allocates 1 to pixels judged as the foreground.

5. The apparatus of claim 1, wherein:
    the object correcting unit further
    averages predetermined calculated probabilities of pixels adjacent to some other remaining pixels to estimate a probability with an average value.

6. The apparatus of claim 1, wherein:
    the object correcting unit further
    mixes a pixel value of a previous image and a pixel value of a current image that are positioned at a same position for each pixel of the image including the corrected image object at a predetermined ratio to correct the image object according to a mixing ratio.

7. A method for extracting an image object, comprising using a computer to execute instructions stored on a computer-readable medium, the instructions when executed performing operations including:
    receiving an image;
    setting a virtual space at which the image object is positioned from the received image;
    extracting the image object from the set virtual space from the received image;
    correcting an image including the extracted image object at least in part by calculating a probability associated with a type allocated to a pixel in the image, the type indicating a level of confidence relating to whether the pixel belongs to a foreground or a background of the image; and
    correcting the image including the extracted image object for each block having a predetermined size,
    wherein the setting the virtual space includes extracting XYZ coordinates of apexes and a center point of polyhedral space as the set virtual space and converts the extracted XYZ coordinates into projection coordinates, and the extracting the image object includes calculating positions of the center point and each pixel in the image using boundary plans constituting the set virtual space on a predetermined projection coordinate system according to the projection coordinates and determines whether the each pixel belongs to a foreground, and
    wherein the correcting the image includes:
    allocating the type for each pixel for each block having a predetermined size in the image including the image object;
    calculating a probability that a pixel allocated as a type in which a foreground or a background is obscurely discriminated belongs to the foreground using a difference in distance and a difference in color from an adjacent pixel; and correcting the image object according to the calculated probability.

8. The method of claim 7, wherein the setting virtual space includes:

receiving a plurality of points; and setting the virtual space including one floor plane constituted by the plurality of received points.

9. The method of claim 8, wherein the setting virtual space includes:

receiving a plurality of points;

setting one floor plane including the corresponding point when the number of points of which the depths are measured validly among points adjacent to the corresponding point for each of the plurality of received points is equal to or more than a predetermined number; and setting the virtual space including the one set floor plane.

10. The method of claim 7, wherein the correcting the image further includes:

averaging predetermined calculated probabilities of pixels adjacent to some other remaining pixels and estimating a probability with an average value.

11. The method of claim 7, wherein the correcting the image further includes:

mixing a pixel value of a previous image and a pixel value of a current image that are positioned at a same position for each pixel of the image including the corrected image object at a predetermined ratio and correcting the image object according to a mixing ratio.

\* \* \* \* \*